United States Patent
Akiyama et al.

(10) Patent No.: US 8,120,345 B2
(45) Date of Patent: Feb. 21, 2012

(54) SEMICONDUCTOR DEVICE AND POWER SUPPLY USING THE SAME

(75) Inventors: Noboru Akiyama, Hitachinaka (JP); Takayuki Hashimoto, Tokai (JP); Takashi Hirao, Hitachi (JP); Koji Tateno, Takasaki (JP); Takuya Ishigaki, Hitachinaka (JP)

(73) Assignee: Renesas Electronics Corporation, Kanagawa (JP)

( * ) Notice: Subject to any disclaimer, the term of this patent is extended or adjusted under 35 U.S.C. 154(b) by 551 days.

(21) Appl. No.: 12/388,819

(22) Filed: Feb. 19, 2009

(65) Prior Publication Data
US 2009/0243575 A1 Oct. 1, 2009

(30) Foreign Application Priority Data
Mar. 27, 2008 (JP) .................................. 2008-082461

(51) Int. Cl.
*G05F 1/00* (2006.01)

(52) U.S. Cl. ........................................ 323/283; 323/282

(58) Field of Classification Search .................. 323/272, 323/281, 282, 283, 285; 341/142, 155
See application file for complete search history.

(56) References Cited

U.S. PATENT DOCUMENTS
7,221,131 B2 * 5/2007 Ozawa et al. .................. 323/272

FOREIGN PATENT DOCUMENTS
JP 2003-299349 10/2003
JP 2007-022298 2/2007

* cited by examiner

*Primary Examiner* — Jeffrey Sterrett
*Assistant Examiner* — Lakaisha Jackson
(74) *Attorney, Agent, or Firm* — Mattingly & Malur, PC (57) ABSTRACT

A semiconductor device for control applied to a constant-voltage power supply device includes a digital-analog converter circuit which outputs a reference voltage corresponding to a value of a first register with taking an output voltage of a reference voltage source as a criterial reference voltage, and generates a control signal for driving a power semiconductor device based on an output voltage of an error amplifier which differentially amplifies a feedback voltage obtained by resistive-dividing on an output voltage of the constant-voltage power supply device and the reference voltage. An analog-digital converter circuit which converts the feedback voltage to a digital value with taking the output voltage of the constant-voltage power supply device as a reference voltage is provided, and based on the output, a value of a first register is corrected so as to offset an effect of an error in voltage dividing ratio of a voltage dividing resistor circuit.

15 Claims, 10 Drawing Sheets

SEMICONDUCTOR DEVICE AND POWER SUPPLY USING THE SAME

CROSS-REFERENCE TO RELATED APPLICATION

The present application claims priority from Japanese Patent Application No. JP 2008-082461 filed on Mar. 27, 2008, the content of which is hereby incorporated by reference into this application.

TECHNICAL FIELD OF THE INVENTION

The present invention relates to a semiconductor device technology. More particularly, the present invention relates to a technique effectively applied to a semiconductor device including a power-supply control circuit.

BACKGROUND OF THE INVENTION

Regarding a high-precision power supply having a small variation in output voltage, for example, a control IC for high-precision switching power supply has been commercialized, the control IC switching values of a variable resistor embedded in a power-supply control IC chip by using a VID (voltage ID) code of 5-bit or 6-bit, and being capable of setting an output voltage in increments of 25 mV.

In addition, Japanese Patent Application Laid-Open Publication No. 2007-022298 and Japanese Patent Application Laid-Open Publication No. 2003-299349 each disclose a power supply circuit in which a plurality of adjusting resistors are arranged in parallel on one side of two voltage dividing resistors connected in series and a switch is provided to each of the adjusting resistors in series, and the power supply circuit adjusts its output voltage by determining on/off of each switch by digital signals.

SUMMARY OF THE INVENTION

Meanwhile, although the technique used in the above-mentioned products has setting values of the output voltage in small increments, it has not been considered shifts in the output voltage due to a variation in reference voltage. In addition, this technique cannot be applied to a power supply including an external voltage dividing resistor and inputting divided voltages to a control IC.

Further, also in the technique disclosed in Patent Documents, there is a variation in resistance values of the adjusting resistors provided in parallel, and it has thus not been sufficient to obtain a high-precision output voltage.

An object of the present invention is to provide a technique to realize a high-precision power supply correcting a variation in reference voltage and a variation in voltage dividing resistor.

The above and other objects and novel characteristics of the present invention will be apparent from the descriptions of the present specification and the accompanying drawings.

The typical ones of the inventions disclosed in the present application will be briefly described as follows.

More particularly, a semiconductor device for control to be applied to a constant-voltage power supply device supplying a predetermined voltage to a load includes a digital-analog converter circuit outputting a reference voltage corresponding to a value of a first register with taking an output voltage of a reference voltage source as a criterial reference voltage. The digital-analog converter circuit generates a control signal (PWM) for driving a power semiconductor device based on an output voltage of an error amplifier (110) differentially amplifying a feedback voltage (Vfb) and the reference voltage (Vref), which are formed based on the output voltage of the constant voltage power supply device. In this manner, it becomes possible to cancel operation characteristics of the digital-analog converter circuit inside the semiconductor device and an offset of the error amplifier according to the setting value of the first register before embedding the semiconductor device to the constant-voltage power supply device.

Further, after embedding the semiconductor device in the constant-voltage power supply device, in the case to obtain a feedback voltage by dividing the output voltage of the constant-voltage power supply device by an external voltage dividing resistor circuit (R1, R2), an analog-digital converter circuit (160) which converts the feedback voltage with taking the output voltage of the constant-voltage power supply device as a reference voltage is provided to correct the value of the first register based on an output of the analog-digital converter circuit so as to offset an effect of an error in voltage dividing ratio of the voltage dividing resistor circuit.

The effects obtained by typical aspects of the present invention will be briefly described below.

According to the present invention, by correcting a variation in reference voltage and a variation in voltage dividing resistor, a variation in output voltage can be supressed so that it becomes possible to supply a stable direct current to a load including an analog circuit and the like.

DESCRIPTIONS OF THE PREFERRED EMBODIMENTS

1. Outline of Embodiments

First, typical embodiments of the invention disclosed in the present application will be briefly described. In the brief descriptions of typical embodiments, each reference symbol in the attached figures to be referred as having brackets applied thereto exemplifies nothing but a concept of a component to which the reference symbol is applied.

[1] A semiconductor device according to the present invention is contained in a constant-voltage power supply device which supplies a predetermined voltage to an external load by driving a power semiconductor device, and the semiconductor device controls operations of the power semiconductor device. The semiconductor device includes: a first register (122); a digital-analog converter circuit (121) outputting a reference voltage (Vref) corresponding to a value of the first register with taking an output voltage of a reference voltage source (120) as a criterial reference voltage (Vref0); an error amplifier (110) differentially amplifying a feedback voltage (Vfb) and the reference voltage (Vref), which are formed based on an output voltage of the constant-voltage power supply device (Vout); and a signal generator circuit (140, 141, 150) generating a control signal (PWM) for driving the power semiconductor device based on an output voltage of the error amplifier. Accordingly, it becomes possible to cancel an error of reference voltage, an error of digital-analog converter circuit, and an offset of error amplifier, etc. according to a setting value of the first register before embedding the semiconductor device in the constant-voltage power supply device.

[2] A specific aspect (first and second embodiments) of the item [1] is, for example, a semiconductor device (100, 400) including a feedback voltage terminal (102) for inputting the feedback voltage coupled (connected) to a one input terminal (−) of the error amplifier (110), and a first signal input terminal (101) capable of inputting a signal for correcting the value of the first register to a first correction value ([Vr1]$^{\#}$) so that a voltage to be inputted to the one input terminal of the error amplifier becomes a target setting voltage.

[3] In the semiconductor device of the item [2], the first signal input terminal is a serial input terminal to which an address of the first register and data to be written in the first register are serially inputted.

[4] In the semiconductor device of the item [2], for example, the feedback voltage is a voltage obtained by dividing the output voltage (Vout) of the constant-voltage power supply device by a predetermined resistive voltage dividing ratio (1/A). At this time, the semiconductor device further includes: a second register (170) holding a digital value ([Vo]$^{\#0}$) obtained by normalizing the resistive voltage dividing ratio by a target output voltage (Vo) of the constant-voltage power supply device; a third register (171) holding a digital value ([0.600]$^{\#}$) obtained by normalizing a target setting value of the reference voltage by the criterial reference voltage (Vref0); an output voltage input terminal (103) to input the output voltage of the constant-voltage power supply device; an analog-digital converter circuit (160) converting a voltage signal to a digital value, the voltage signal being divided by an external voltage dividing resistor circuit (R1, R2) and inputted to the feedback voltage terminal with taking a voltage inputted to the output voltage input terminal as a first reference voltage; and a first correction computing circuit (180, 181, 182) calculating a correction value based on an output of the analog-digital converter circuit. A second correction value ([Vr2]$^{\#}$) is written into the first register based on a computation result of the first correction computing circuit to correct the reference voltage. In this manner, after embedding the semiconductor device in the constant-voltage power supply device, an effect of an error of the voltage dividing ratio of the externally provided voltage dividing resistor circuit can be offset, thereby further reducing a variation of the output voltage.

[5] In the semiconductor device of the item [4], for example, the first correction computing circuit includes: a first computing circuit (181) obtaining a first difference between the digital value converted by the analog-digital converter circuit and the value held in the second register; a second computing circuit (180) obtaining a correction value by using values of the first difference, the second register, and the third register; and a third computing circuit (182) adding an computation result of the second computing circuit with the first correction value of the first register (input register for the DAC circuit 122).

[6] The semiconductor device of the item [4] includes, for example, an operation mode for correcting the reference voltage by performing a computation by the first correction computing circuit and writing its computing result in the first register. This operation mode is automatically set by a power-on reset, or made arbitrary settable externally.

[7] Another specific aspect (third and fourth embodiments) of the item [1] is a semiconductor device (500, 700) further including: an output voltage input terminal (503) receiving the output voltage of the constant-voltage power supply device; a first resistor (R3) and a second resistor (R4) connected in series and forming the feedback voltage (Vfb) on a series connection node by dividing the output voltage inputted to the output voltage input terminal; a feedback voltage terminal (502) connected to the series connection node of the first resistor and the second resistor; a first switch (SW1) connecting an input terminal (−) of the feedback voltage in the error amplifier and the output voltage input terminal; a second switch (SW2) connecting the input terminal of the feedback voltage in the error amplifier and the feedback voltage terminal; and a second signal input terminal (501) capable of inputting a signal for correcting the value of the first register to a third correction value so that a voltage of the feedback voltage terminal becomes a target setting voltage. Accordingly, an effect due to an error of a resistive voltage dividing ratio formed by the first resistor (R3) and the second resistor (R4) can be mitigated by the semiconductor device alone before embedding the semiconductor device in the constant-voltage power supply device.

[8] The semiconductor device of the item [7] further includes: a fourth register (570) holding a digital value ([Vo/A]$^{\#}$) of the target setting voltage; a fifth register (571) holding a digital value ([Vof]$^{\#}$) of an error voltage (Vof) with respect to the target setting voltage; a sixth register (572) holding a digital value ([1/(1+ΔR)]$^{\#}$) of an error coefficient including an error of the resistive voltage dividing ratio obtained on a connection node of the first resistor and the second resistor; and a fourth computing circuit (580) obtaining a correction value by using values of the fourth, fifth, and sixth registers. A computing result of the fourth computing circuit is written in the first register as a fourth correction value to correct the reference voltage Vref.

[9] In the semiconductor device of the item [8], to measure the voltage of the feedback voltage terminal for obtaining the error coefficient including an error of the resistive voltage dividing ratio, the second switch is turned off and the first switch is turned on after the value of the first register is corrected to the third correction value.

[10] In the semiconductor device of the item [8], each digital value of the target setting voltage, the error voltage, and the error coefficient is a digital value normalized by the criterial reference voltage.

[11] Still another specific aspect (embodiment 4) of the item [1] is a semiconductor device (700) including a seventh register (710) holding a digital value for power-down and a third signal terminal (705) for inputting a power-down signal, and in the semiconductor device, an input signal from the digital-analog converter circuit is switched from the held value of the first register to the held value of the seventh register in response to inputting the power-down signal to the third signal terminal, and the reference voltage to be inputted to the error amplifier is lowered to a predetermined value. Accordingly, in the case of having a power-down mode for lowering a power supply voltage to be supplied to a load when a consumption current of the load is small, the power supply voltage can be easily changed in a short time, thereby speeding up switching between a normal operation mode and the power-down mode.

[12] A constant-voltage power supply device according to the present invention is a device which supplies a predetermined voltage to an external load by driving a power semiconductor device, and includes a semiconductor device which controls operations of the power semiconductor device. The semiconductor device includes: a first register; a digital-analog converter circuit outputting a reference voltage corresponding to a value of the first register with taking an output voltage of a reference voltage source as a criterial reference voltage; an error amplifier (110) differentially amplifying a feedback voltage (Vfb) and the reference voltage (Vref), which are formed based on an output voltage of the constant-voltage power supply device; and a signal generator circuit (140, 141, 150) generating a control signal (PWM) for driving the power semiconductor device based on an output voltage of the error amplifier.

[13] A specific aspect (first and second embodiments) of the constant-voltage power supply device of the item [12] has applied thereto, for example, the semiconductor device (100, 400) further including a feedback voltage terminal (102) for inputting the feedback voltage coupled to one input terminal (−) of the error amplifier (110), and a first signal input terminal (101) capable of inputting a signal for correcting the value of the first register to a first correction value ([Vr1]$^{\#}$) so that a voltage to be inputted to the one input terminal of the error amplifier becomes a target setting voltage.

[14] Another specific embodiment (third and fourth embodiments) of the constant-voltage power supply circuit of the item [12] has applied thereto, for example, the semiconductor device (500, 700) further including: an output voltage input terminal (503) receiving the output voltage of the constant-voltage power supply device; a first resistor (R3) and a second resistor (R4) connected in series and forming the feedback voltage (Vfb) on a series connection node by dividing the output voltage inputted to the output voltage input terminal; a feedback voltage terminal (502) connected to the series connection node of the first resistor and the second resistor; a first switch (SW1) connecting an input terminal (−) of the feedback terminal in the error amplifier and the output voltage input terminal; a second switch (SW2) connecting the input terminal of the feedback voltage in the error amplifier and the feedback voltage terminal; a second signal input terminal (501) capable of inputting a signal for correcting the value of the first register to a third correction value so as to make a voltage of the feedback voltage terminal be a target setting voltage in the state where the second switch is turned on and the first switch is turned off; a fourth register (570) holding a digital value ([V0/A]$^{\#}$) of the target setting voltage; a fifth register (571) holding a digital value ([Vof]$^{\#}$) of an error voltage (Vof) to the target setting voltage; a sixth register (572) holding a digital value ([1/(1+ΔR)]$^{\#}$) of an error coefficient including an error of the resistive voltage dividing ratio obtained on a connection node of the first resistor and the second resistor; and a fourth computing circuit (580) obtaining a correction value by using values of the fourth, fifth, and sixth registers. In the constant-voltage power supply device, to measure the voltage of the feedback voltage terminal for obtaining an error coefficient including an error of the resistive voltage dividing ratio, the second switch is turned off and the first switch is turned on after correcting the value of the first register to the third correction value. And, a computation result of the fourth computing circuit is written in the first register as a fourth correction value to correct the reference voltage (Vref).

Another specific aspect (fourth embodiment) of the constant-voltage power supply device has applied thereto the semiconductor device further including a seventh register holding a digital value for power-down, and a third signal terminal for inputting a power-down signal. In response to inputting the power-down signal to the third signal terminal, an input signal of the digital-analog converter circuit is switched from the held value of the first register to the held value of the seventh register, and the reference voltage to be inputted to the error amplifier is lowered to a predetermined value.

2. Details of Embodiments

Embodiments will be described in further detail. Hereinafter, embodiments of the present invention will be described in detail with reference to the accompanying drawings. Note that, components having the same function are denoted by the same reference symbols throughout the drawings for describing the embodiment, and the repetitive descriptions thereof will be omitted.

Hereinafter, embodiments of the present invention will be described based on the drawings. Note that, components having the same function are denoted by the same reference symbols throughout the drawings for describing the embodiments, and the repetitive description thereof is omitted as much as possible.

First Embodiment

Figure 1:
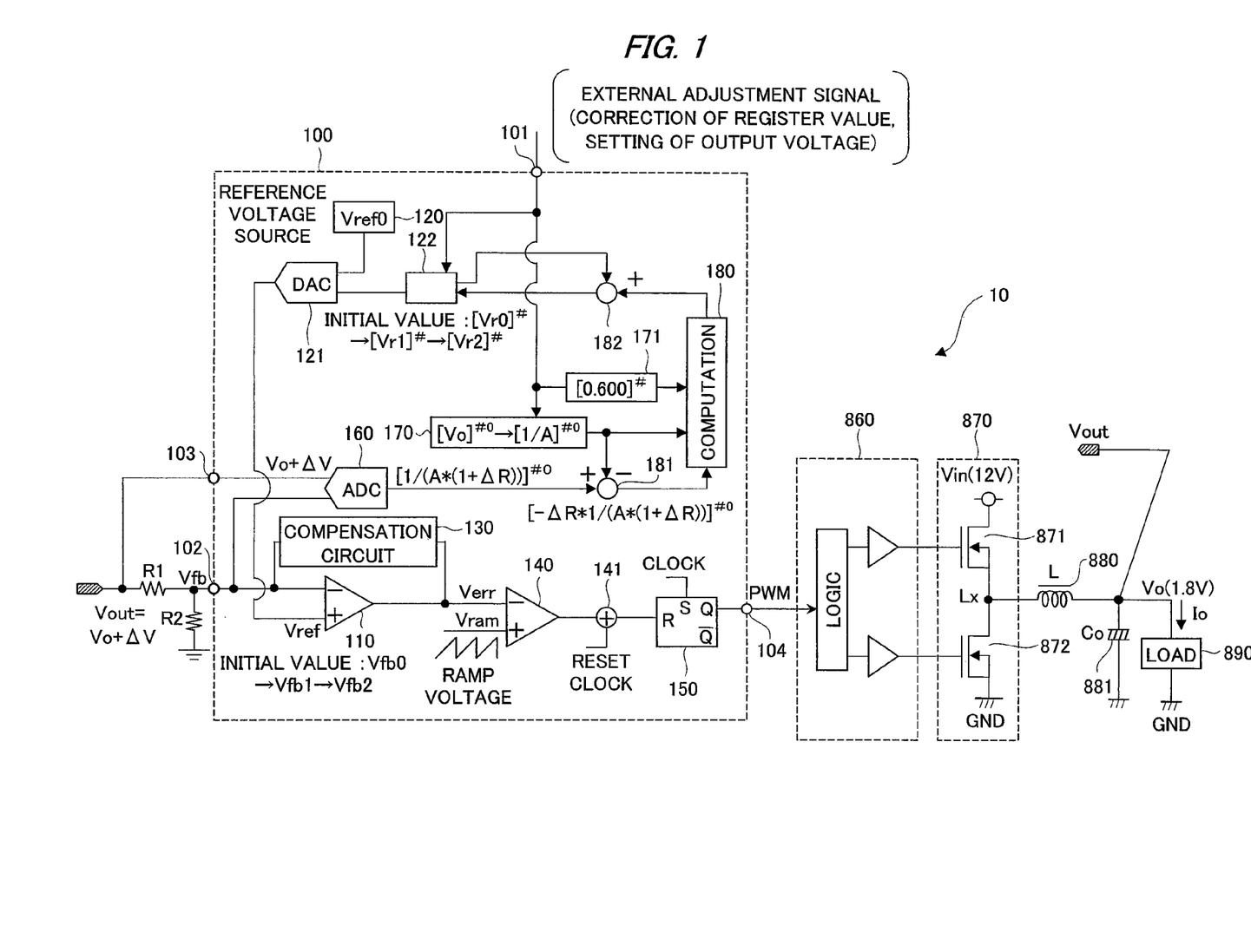
FIG. 1 is a circuit block diagram of a semiconductor device and a power supply device using the semiconductor device according to a first embodiment of the present invention.
Figure 2:
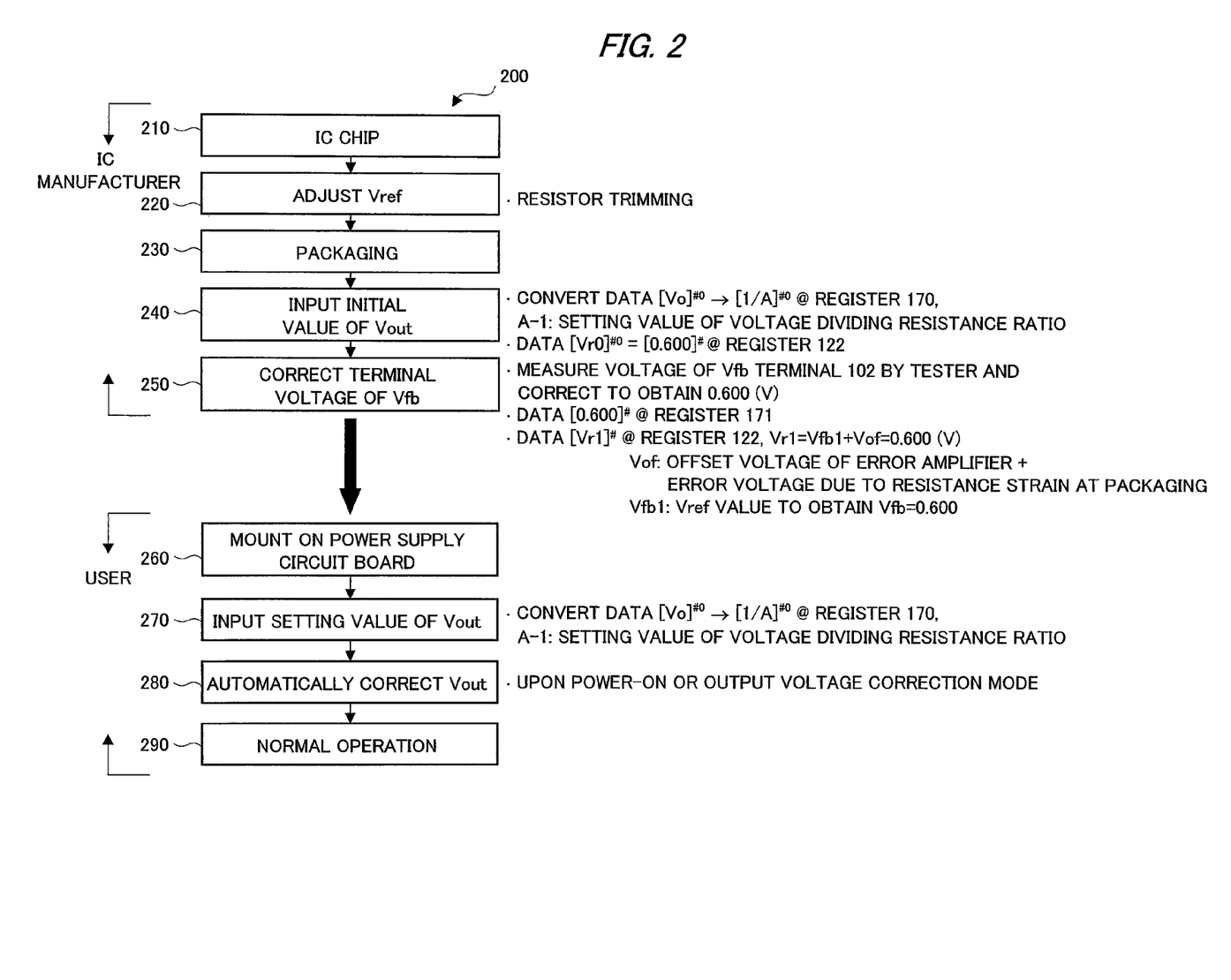
FIG. 2 is a process chart showing an outline of a process of the semiconductor device of the first embodiment from a chip state through being embedded on a power supply circuit board to an operation.
Figure 3:
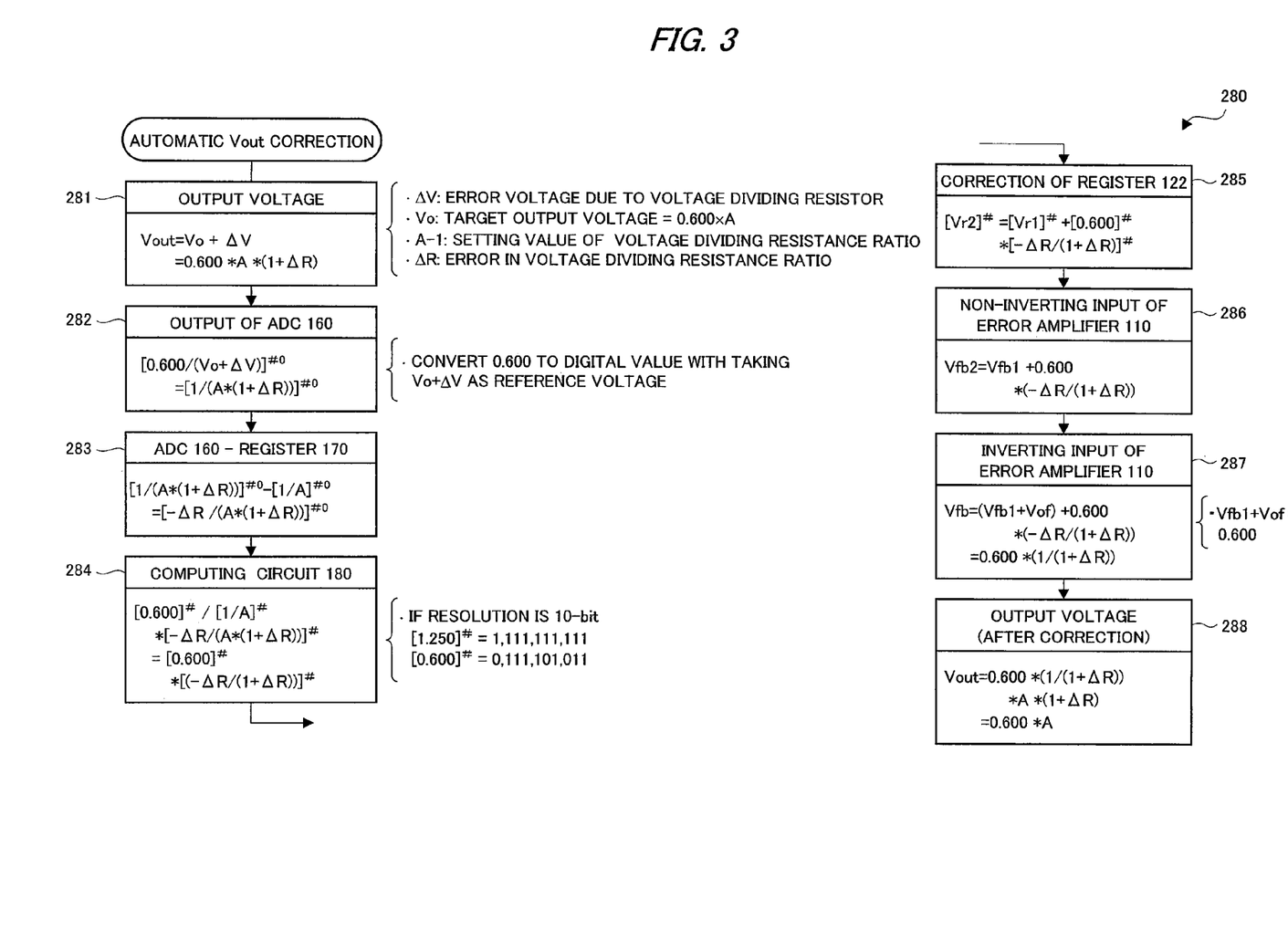
FIG. 3 is an explanatory diagram showing an outline of an automatic Vout correction step.
Figure 4:
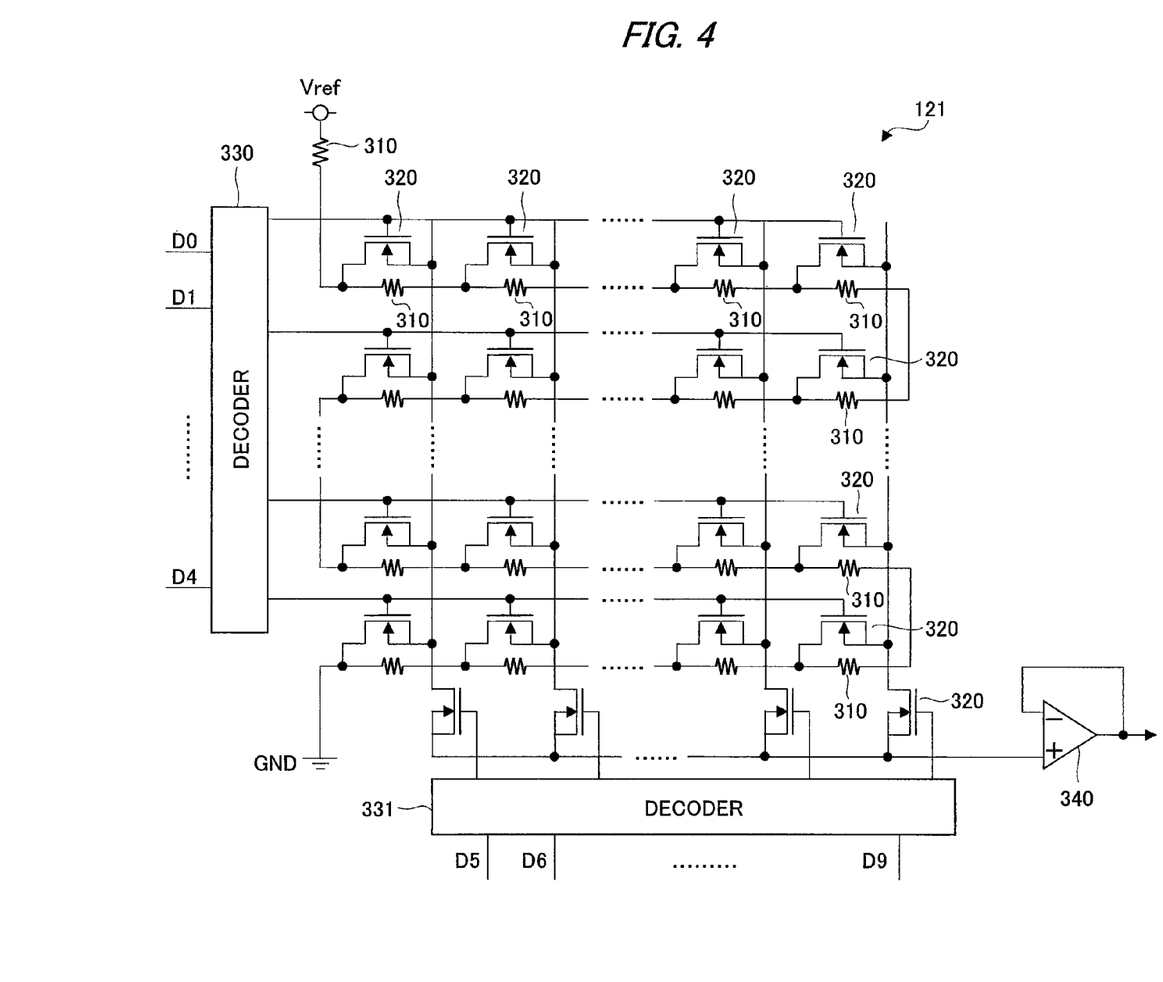
FIG. 4 is a circuit block diagram showing an example of a digital-analog converter circuit (DAC circuit) used in the semiconductor device of the present invention.

A first embodiment of the present invention will be described with reference to FIG. 1 to FIG. 4. FIG. 1 is a circuit block diagram of a semiconductor device and a power supply device using the semiconductor device of the first embodiment of the present invention, FIG. 2 is a process chart showing an outline of a process of the semiconductor device of the first embodiment from a chip state to an operation as being embedded on a power supply circuit board, FIG. 3 is an explanatory diagram showing an outline of an automatic Vout correction step, and FIG. 4 is a circuit block diagram showing an example of a digital-analog converter circuit (DAC circuit) used in the semiconductor device of the present invention.

In FIG. 1, the power supply device (switching power supply device) 10 using the semiconductor device of the first embodiment of the present invention includes: a power supply control IC 100 performing control of pulse width modulation (PWM); a driver circuit 860; a switching circuit 870; an input capacitor (not shown); a choke coil 880; and an output capacitor 881, and supplies a constant voltage to a load circuit 890. The switching circuit 870 includes a high-side power MOSFET 871 for control and a low-side power MOSFET 872 for synchronization which are power semiconductor devices.

Each of the power supply control IC 100, the driver circuit 860, the high-side power MOSFET 871, and the low-side power MOSFET 872 is a semiconductor chip, and each chip is electrically connected to each other and stored in one package. In addition, there may be a case where the power supply control IC 100 and the driver circuit 860 are made of different semiconductor chips respectively, and a case where both of them are integrated to one chip to be a power supply control IC.

The power supply control IC 100 supplies a signal for controlling a time period (ON period), in which the power MOSFETs 871 and 872 are put in an On state, to a gate of each power MOSFET. The power supply control IC 100 is a power supply control circuit including a semiconductor circuit to be a feature of the present invention, and the feature lies in a method of obtaining a highly precise output by correcting a variation of an output voltage of a power source. Details of the same will be described later.

Figure 10:
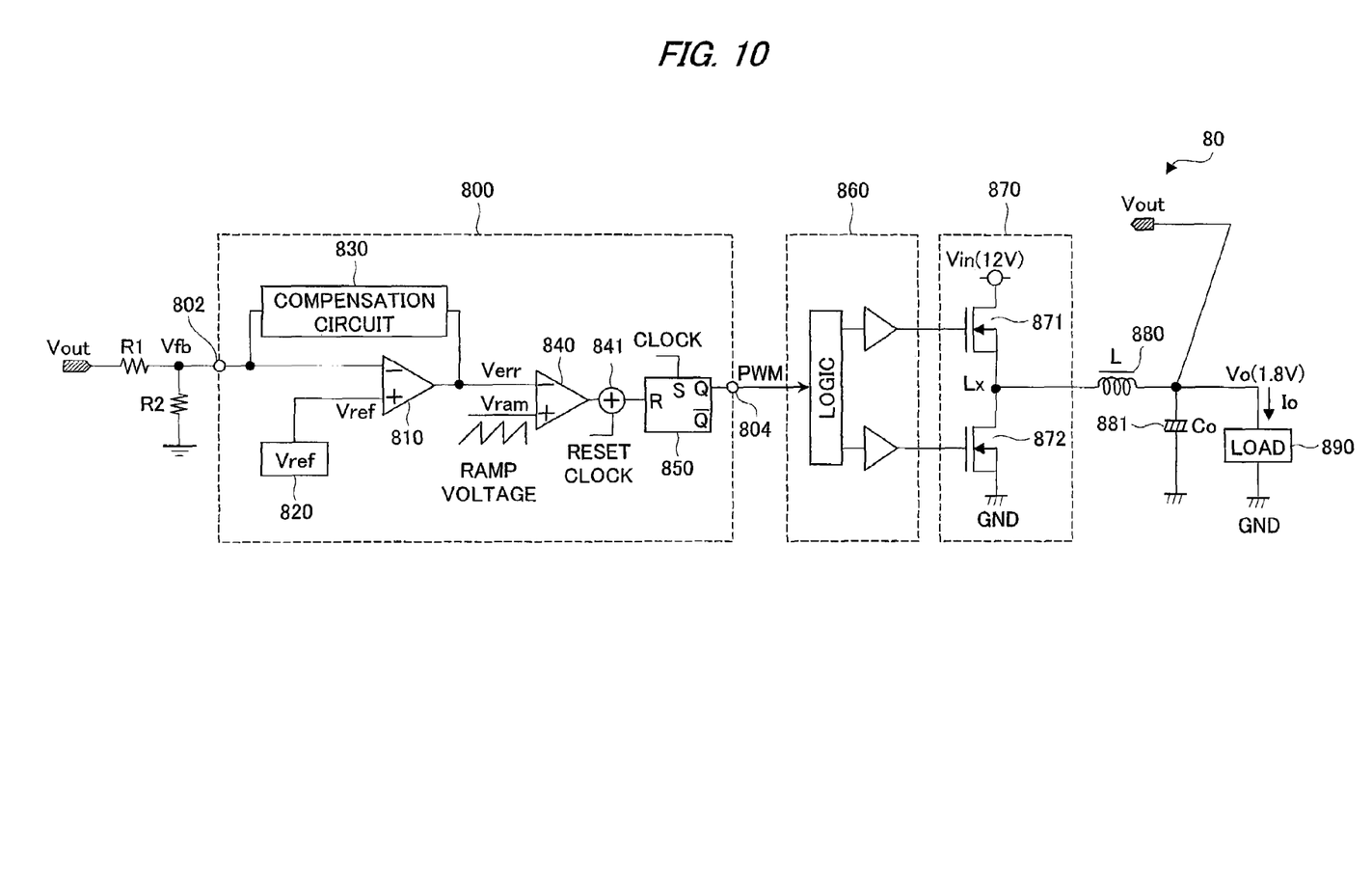
FIG. 10 is a circuit block diagram of a power supply control IC and a power supply device using the power supply control IC before applying a variation correction of output voltage according to the present invention.

Here, based on FIG. 10 showing an example of a power supply control IC 800 and a power supply device 80 using the power supply control IC 800 before applying a variation correction of output voltage according to the present invention, operations of the power source and a cause of error of output voltage will be described.

The power supply control IC 800 includes: an error amplifier 810; a reference voltage circuit 820; a compensation circuit 830; a comparator circuit 840; a sum computing circuit 841; and a flip-flop circuit 850.

When a clock signal inputted to a set signal input (S) of the flip-flop circuit 850 becomes an on-state pulse (in the present Specification, "on-state pulse" is defined as a pulse signal having a voltage level, whose signal rises from a low level to a high level and returns to the low level after a predetermined time period), a PWM on-state pulse is generated at the rising edge. And, the generated PWM on-state pulse is terminated as follows. A voltage difference between a feedback voltage Vfb and a reference voltage Vref is amplified by the error amplifier 810, and an error voltage Verr that is an output of the error amplifier 810 is compared with a ramp voltage Vram by the comparator circuit 840, and then an output signal of the comparator circuit 840 is inputted to a reset signal input (R) of the flip-flop circuit 850. The output signal of the comparator circuit 840 becomes the high level at a time point where the ramp voltage Vram exceeds the error voltage Verr, then the flip-flop circuit 850 is reset to terminate the PWM on-state pulse.

An operation of a buck-type switched-mode power supply using a PWM control will be briefly described. It is assumed that the load circuit 890 consumes a constant current Iout.

While the PWM on-state pulse is being generated, the high-side power MOSFET 871 is in an On state and a current is flown into the choke coil 880 from a direct current source (not shown) on the input side via an input voltage Vin terminal, so that a current is supplied to the load circuit 890. At this time, the low-side power MOSFET 872 is in an Off state.

Although the high-side power MOSFET 871 is turned off when the PWM on-state pulse is terminated, the current is kept flowing by energy accumulated on the choke coil 880 and the output capacitor 881, and thus a freewheel current is flown from a ground (GND) end side to an Lx side via a built-in diode (not shown) in the low-side power MOSFET 872. After a dead time period in which both of the high-side and low-side power MOSFETs 871 and 872 are in the Off state, the low-side power MOSFET 872 is turned on. Then the freewheel current is kept flowing inside the low-side power MOSFET 872.

Just before the PWM on-state pulse is generated again, the dead time period in which both of the high-side and low-side power MOSFETs 871 and 872 become in the Off state is once passed again, and then the PWM on-state pulse of the next switching cycle is generated.

If the load current Iout is constant, an output voltage Vout which appears at the load circuit 890 becomes a value obtained by multiplying an input voltage Vin by a ratio of the on-state period of the PWM on-state pulse and a switching cycle.

By an action of the error amplifier 810, the feedback voltage Vfb becomes identically same with the reference voltage Vref inputted to a non-inverting input (+ side) of the error amplifier 810. Therefore, the output voltage Vout is represented by Expression (1).

$$Vout = Vref \times (R1+R2)/R2 \qquad \text{Expression (1)}$$

However, in practice, two causes of an error giving a variation in the output voltage are included in Expression (1). One of them is a variation of the reference voltage Vref. An error occurs in Vref due to a strain of a resistor element configuring the reference voltage circuit upon mounting the chip, and an offset voltage of the error amplifier. The error caused by that is up to about ±1%. The other cause is a variation of voltage dividing resistors R1 and R2, and an error due to voltage division becomes up to ±2% when using a resistor having a precision of ±1%. Due to these causes, it has been difficult to make precision of output voltage of the circuit of FIG. 10 lower than or equal to ±1%.

In the following, let's back to descriptions for FIG. 1 to FIG. 4 to describe the power supply control IC 100 configuring the power supply device 10 of the first embodiment in detail.

The power supply control IC 100 of the first embodiment shown in FIG. 1 includes: an error amplifier 110 required for the PWM control; the reference voltage source 120; a compensation circuit 130; a comparator circuit 140; a sum computing unit 141; and a flip-flop circuit 150. In addition, the power supply control IC 100 includes an digital-analog converter circuit (hereinafter, referred to as DAC circuit) 121; an input register for the DAC circuit 122; an analog-digital converter circuit (hereinafter, referred to as ADC circuit) 160; registers 170 and 171; computing circuits 180, 181, and 182; a first signal terminal 101 for inputting an external adjustment signal; a Vfb terminal 102 for inputting a feedback voltage; and a Vo input terminal 103 for inputting an output voltage. In FIG. 1, a value to which "[ ]#" or "[ ]#O" is applied means a digital value.

Here, for example, a band-gap reference circuit is used for the reference voltage source 120. The band-gap reference circuit uses bipolar transistors having base-emitter voltages $V_{BE}$ different to each other, and compensates to make a constant voltage by utilizing a fact that a difference in $V_{BE}$: $\Delta V_{BE}$ and the base-emitter voltage $V_{BE}$ respectively have positive and negative temperature coefficients.

FIG. 2 shows a process chart showing an outline of a process of the semiconductor device of the first embodiment from a chip state through being embedded on a power supply circuit board to an operation, and FIG. 3 shows an explanatory diagram showing an outline of an automatic Vout correction step. With reference to FIG. 1 to FIG. 3, a mechanism realizing a high-precision output voltage for the power supply control IC 100 will be described.

After producing an IC chip in a step 210, while a Vref value (e.g., 0.600 V) is adjusted by resistor trimming in a step 220, there occurs a strain resistance in packaging in a step 230 posing an error in Vref. Accordingly, a correction of the Vref value is made in steps 240 and 250. In the step 240, an initial setting value of Vout is converted to "a value corresponding to an inverse of (a setting value of voltage dividing resistance ratio+1), that is, a voltage dividing ratio (=1/A)", and the converted value is inputted from the first signal terminal 101 as 10-bit serial data. "Voltage dividing resistance ratio" means R1/R2, and 1/A corresponds to a voltage dividing ratio of Vfb to Vout. For example, in the case where Vref is 0.600 V and the initial setting value of Vout is 1.800 V, A=3. $[1/A]^{\#0}$ is held in the register 170 as a digital value of 1/A. Here, 1/A=0.600/Vo (Vo is a target output voltage), and $[1/A]^{\#0}$ means a digital value obtained by normalizing 0.600 V by Vo. $[Vr0]^{\#}=[0.600]^{\#}$, that is, a digital value obtained by normalizing 0.600 V by an output voltage Vref0=1.250 V of the reference voltage source 120 is inputted to the register 122. For example, in the case of 10-bit data, $[0.600]^{\#}$=0, 111, 101, 011. Similarly, the value of $[0.600]^{\#}$ is also stored in the register 171. And, a voltage of the Vfb terminal 102 is measured by a tester in the step 250, and the value of the register 122 is corrected to $[Vr1]^{\#}$ via the first signal terminal 101 so as to make Vfb=0.600 V. Data $[Vr1]^{\#}$ is held in the register 122. Here, Vr1=Vfb1+Vof=0.600 V, where Vfb1 is a value of the reference voltage Vref when the voltage of Vfb terminal is matched to 0.600 V, and Vof is a sum of an offset voltage of the error amplifier and an error voltage due to the strain resistance in packaging. The DAC circuit 121 outputs an analog voltage corresponding to the digital data set in the register 122 with taking the output voltage of the reference voltage source 120 as a criterial reference voltage. According to the foregoing process, the voltage of the Vfb terminal can be corrected to 0.600 V. The process up to here is done by an IC manufacturer, and values inputted to respective registers formed of nonvolatile memories are maintained even after the power of the power supply control IC 100 is turned off.

The following process from mounting on a power supply circuit board of a step 260 is done by a user. After mounting the power supply control IC 100 on the power supply circuit board, when the user inputs a setting value of Vout to a graphic user interface (GUI) in a step 270, 10-bit serial data that is obtained by a conversion to "an inverse of (a setting value of voltage dividing resistance ratio+1)" (=1/A) by GUI is inputted from the first signal terminal 101. Then, when the power supply is turned on, an automatic Vout correction in a step 280 is performed, and it comes to a normal operation mode (step 290) after correcting an error in the output voltage due to a variation of the external voltage dividing resistors.

The automatic Vout correction in the step 280 will be described with reference to FIG. 3. In an initial step 281 of the automatic Vout correction, the output voltage Vout=Vo+ΔV=0.600×A×(1+ΔR) is inputted to the Vo input terminal 103. Here, Vo is the target output voltage, ΔV is an error in the output voltage due to a variation of the external voltage dividing resistors R1 and R2, ΔR is an error in the voltage dividing ratio, and A is (the setting value of the voltage dividing ratio+1). In a step 282, 0.600 V is converted to a digital value $[0.600/(Vo+\Delta V)]^{\#}=[1/(A\times(1+\Delta R))]^{\#0}$ by the ADC circuit 160 with taking (Vo+ΔV) as a reference voltage. In short, a voltage dividing ratio of Vfb (0.600 V) to actual Vout including the error is obtained. Then, in a step 283, the value of the register 170 is subtracted from an output value of the ADC circuit 160 by the computing circuit 181, and $[-\Delta R/(A\times(1+\Delta R))]^{\#0}$ is obtained. This means an error component in the actual voltage dividing ratio. In a step 284, after $[1/A]^{\#0}$ and $[-\Delta R/(A\times(1+\Delta R))]^{\#0}$ which are digital values normalized by Vo are converted to $[1/A]^{\#}$ and $[-\Delta R/(A\times(1+\Delta R))]^{\#}$ which are digital values normalized by Vref0=1.250 V in the computing circuit 180, $[0.600]^{\#}/[1/A]^{\#}\times[-\Delta R/(A\times(1+\Delta R))]^{\#}$ is computed, thereby obtaining $[0.600]\times[-\Delta R/(1+\Delta R)]^{\#}$. In short, an error voltage generated due to the error component ([−ΔR/(A×(1+ΔR))]$^{\#}$) in the actual voltage dividing ratio with respect to the target output voltage Vo ($[0.600]^{\#}/[1/A]^{\#}=[0.600]^{\#}/[0.600/Vo]^{\#}=[Vo]^{\#}$) is obtained. In a step 285, an output value of the computing circuit 180 is added to $[Vr1]^{\#}$ held in the register 122 by using the computing circuit 182 to rewrite the value of the register 122 (correction of register 122). A correction value of the register 122 becomes $[Vr2]^{\#}$. $[Vr2]^{\#}=[Vr1]^{\#}+[0.600]^{\#}\times[-\Delta R/(1+\Delta R)]^{\#}$. When the register 122 is corrected, an analog value of a non-inverting input (+ side) of the error amplifier 110 is changed from Vfb1 to Vfb2=Vfb1+0.600×(−ΔR/(1+ΔR)) (step 286). And, an analog value of an inverting input (− side) of the error amplifier 110 becomes Vfb=(Vfb1+Vof)+0.600×(−ΔR/(1+ΔR))= 0.600×(1/(1+ΔR)) (step 287). As a result, the output voltage Vout after the correction becomes 0.600×(1/(1+ΔR))×A×(1+ΔR)=0.600×A (=Vo), thereby obtaining the targeted output voltage Vo (step 288).

In practice, while the variation in output voltage cannot be made to zero because there are quantization errors of the ADC circuit 160 and the DAC circuit 121, when 10-bit ADC circuit and DAC circuit are used, a precision lower than or equal to ±1% can be sufficiently obtained.

FIG. 4 shows an example of the DAC circuit 121 used in the power supply control IC of the present invention. The DAC circuit 121 is a 10-bit digital-analog converter circuit including: a plurality of resistors 310; a plurality of switches 320; decoder circuits 330 and 331; and a unity gain buffer 340. Note that, in the present invention, since a load (in this case, the error amplifier) to which the output of the DAC circuit is connected is fixed, the unity gain buffer 340 may be eliminated.

Second Embodiment

Figure 5:
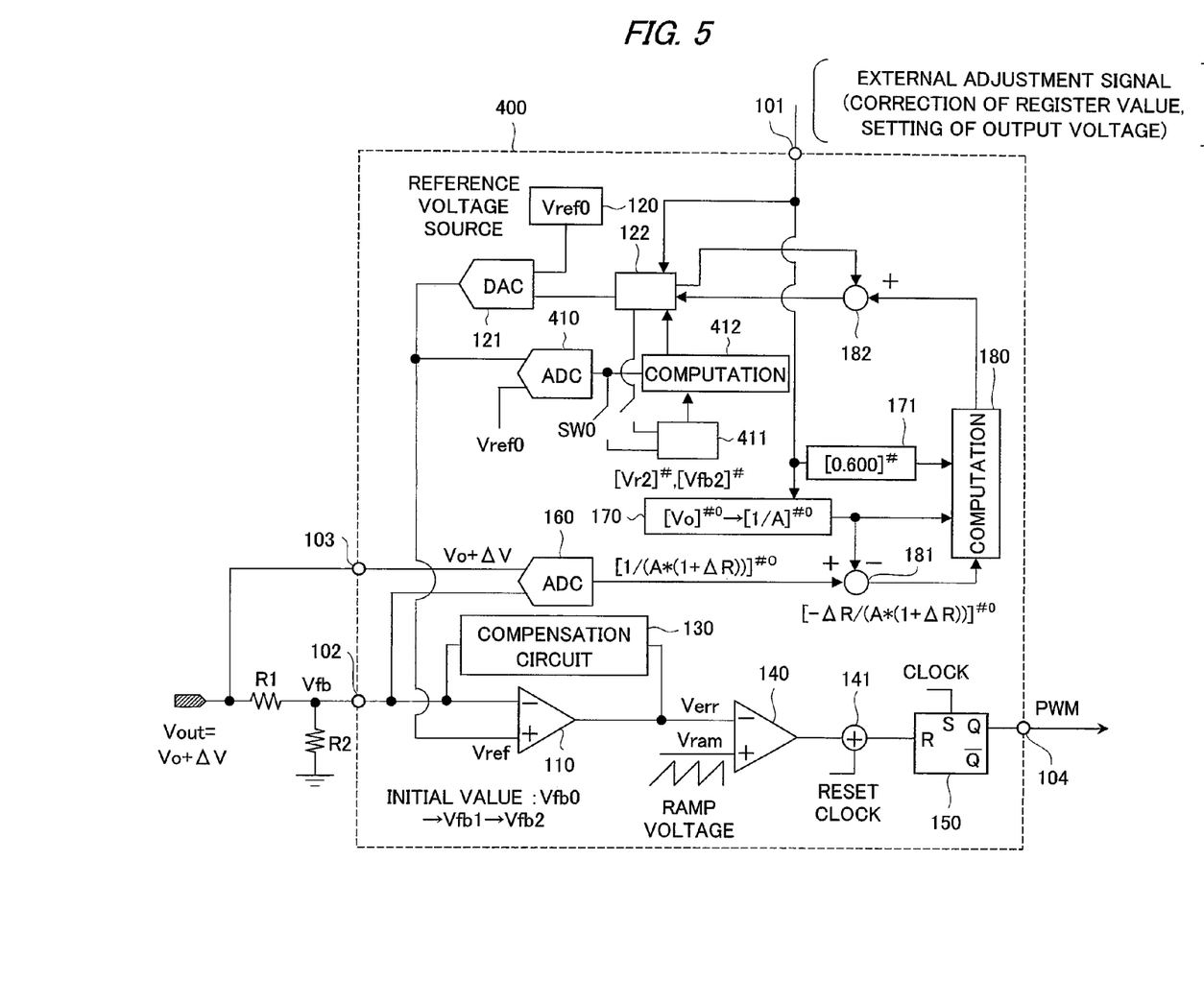
FIG. 5 is a circuit block diagram of a semiconductor device according to a second embodiment of the present invention.

A second embodiment of the present invention will be described with reference to FIG. 5. FIG. 5 is a circuit block diagram of a semiconductor device according to the second embodiment of the present invention. A different point from the first embodiment is that the semiconductor device of the second embodiment includes an ADC circuit 410, a register 411, a computing circuit 412, and a switch SW0. These circuits operate to prevent a fluctuation of the output voltage due to a temperature rising in the normal operation mode. The operation will be described hereinafter. At the time point when the correction of the output voltage (step 280 in FIG. 2) is finished, the switch SW0 is turned on to hold the correction value of the register 122 $[Vr2]^{\#}$ and the value obtained by converting the output value of the DAC circuit 121 to a digital value $[Vfb2]^{\#}$ in the register 411. After holding the values, the switch SW0 is turned off. And, in the normal operation time, a difference between an output value of the ADC circuit 410 and a value just after the correction $[Vfb2]^{\#}$ is computed, and the value of the register 122 just after the correction $[Vr2]^{\#}$ is added to the difference, so that the value of the register 122 is rewritten. In this manner, the fluctuation in output voltage due to temperature change can be suppressed. Note that, a temperature dependence of the output voltage of the reference voltage source 120 is originally small, and thus a temperature change does not abruptly occur. Therefore, operational frequencies of the ADC circuit 410 and the computing circuit 412 are only about several tens of kHz to hundred kHz, and thus an increment of power consumption of the power supply IC is small even when these circuits are added.

Third Embodiment

Figure 6:
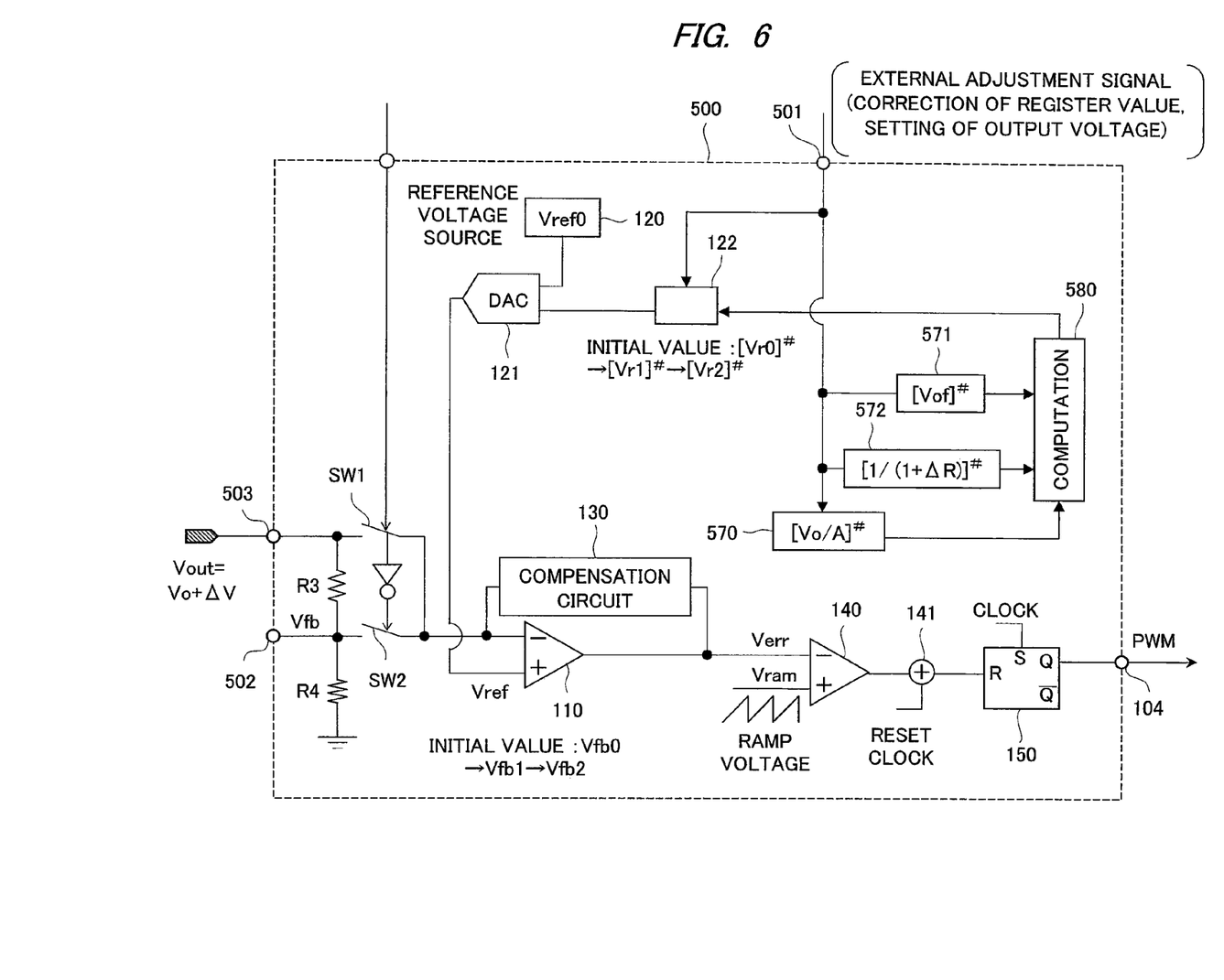
FIG. 6 is a circuit block diagram of a semiconductor device according to a third embodiment of the present invention.

A third embodiment of the present invention will be described with reference to FIG. 6 to FIG. 8. FIG. 6 is a circuit block diagram of a semiconductor device according to a third embodiment of the present invention, FIG. 7 is a process chart showing an outline of a process of the semiconductor device of the third embodiment from a chip state through being embedded on a power supply circuit board to an operation, and FIG. 8 is an explanatory diagram showing an outline of an output voltage correction step.

A different point from the first embodiment is that voltage dividing resistors R3 and R4 are built-in in a power supply control IC 500, and switches SW1 and SW2 used in the output voltage correction are provided. Therefore, a configuration of registers, held data, and a calculation content of a computing circuit 580 are also different from the first embodiment, and the ADC 160 is unnecessary.

Figure 7:
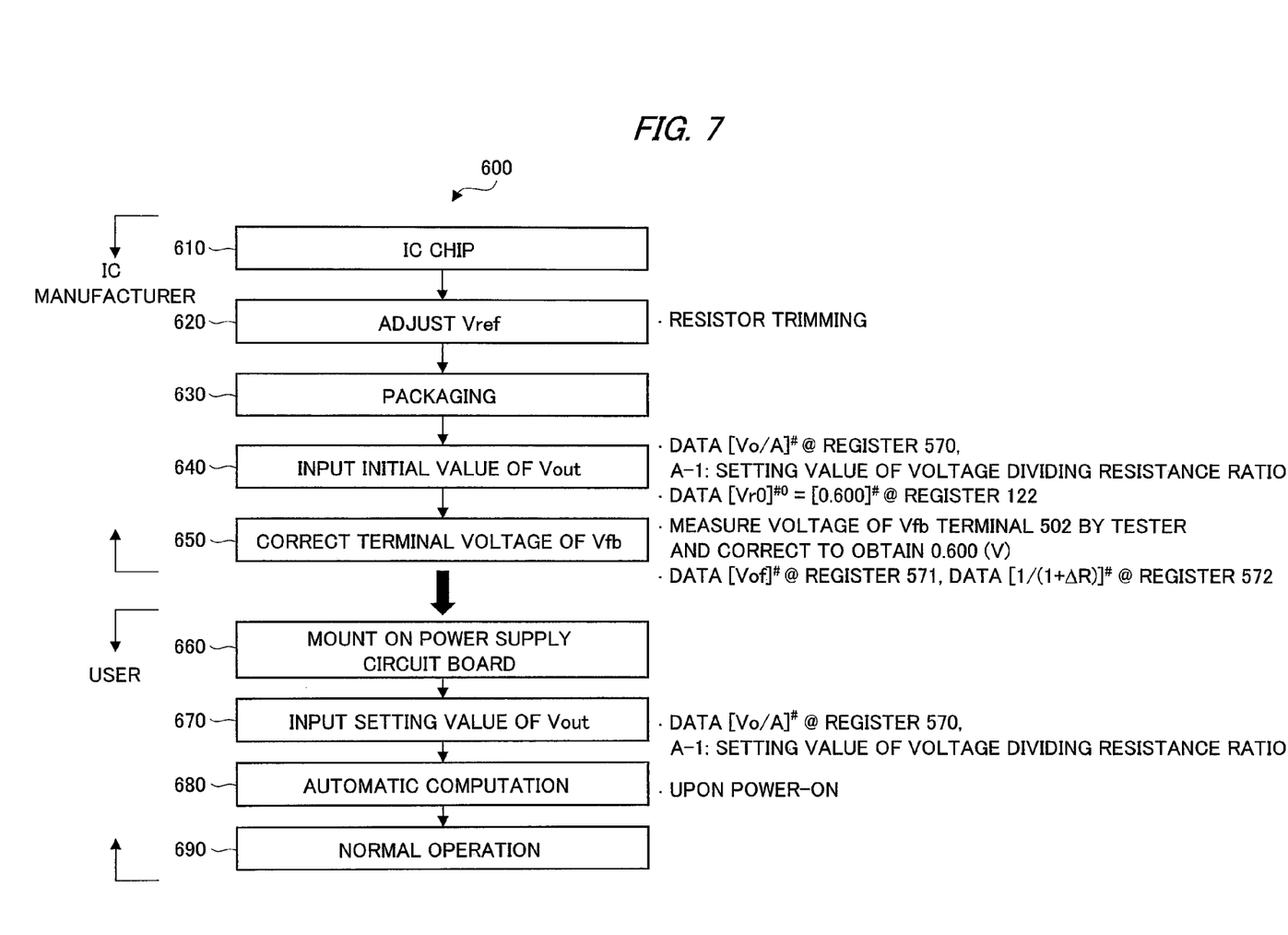
FIG. 7 is a process chart showing an outline of a process of the semiconductor device of the third embodiment from a chip state through being embedded on a power supply circuit board to an operation.
Figure 8:
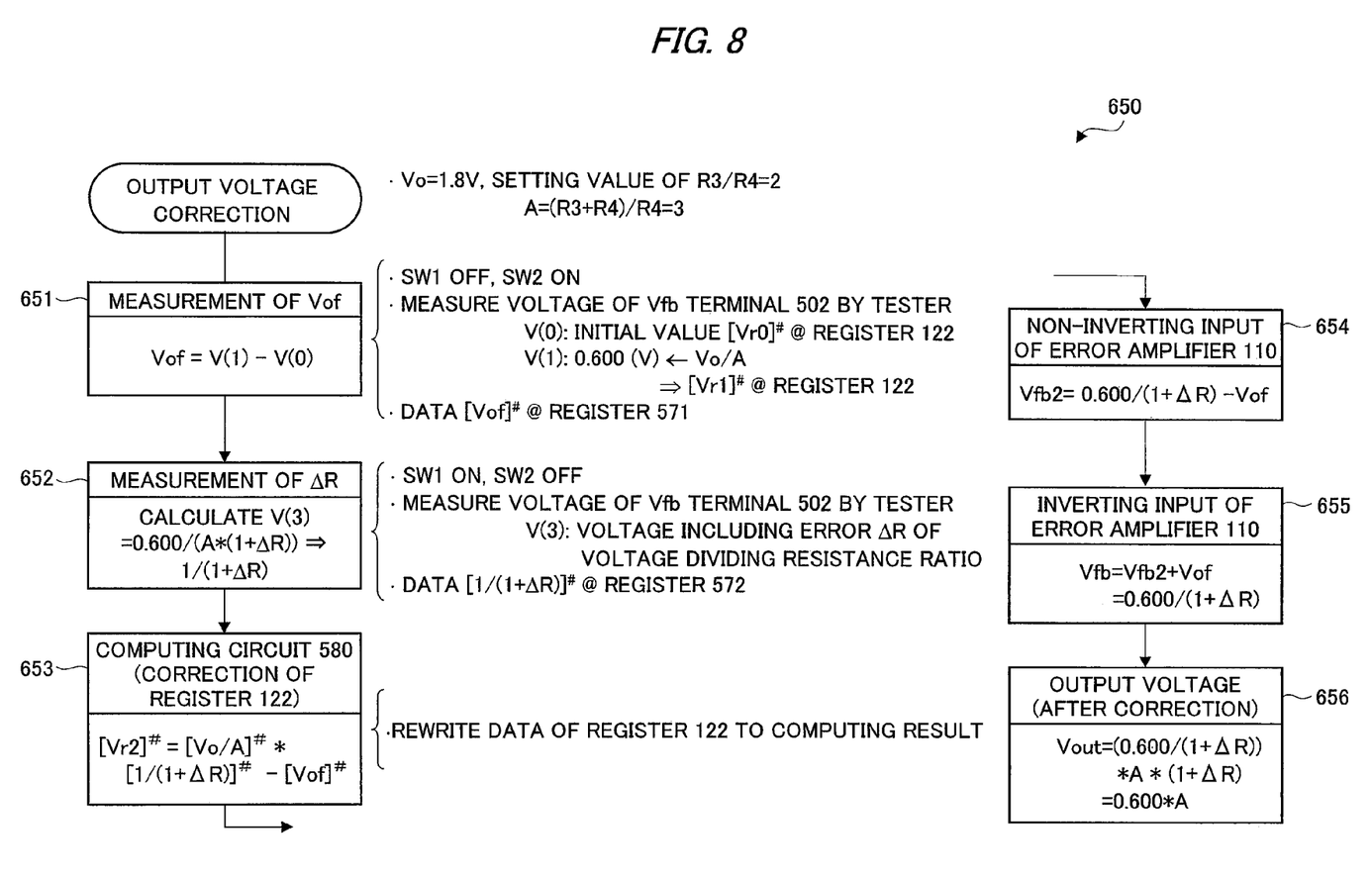
FIG. 8 is an explanatory diagram showing an outline of an output voltage correction step.

FIG. 7 shows a process chart of an outline of a process of the power supply control IC 500 from a chip state through being embedded on a power supply circuit board to an operation, and FIG. 8 shows an outline of an automatic Vout correction step. With reference to FIG. 7 and FIG. 8, a mechanism for realizing a high-precision output voltage at the power supply control IC 500 will be described.

After producing an IC chip in a step 610, while a Vref value (e.g., 0.600 V) is adjusted by resistor trimming in a step 620, there occurs a strain resistance in packaging in a step 630 causing an error in Vref. Accordingly, Vref is corrected in steps 640 and 650. In the step 640, an initial setting value of Vout is inputted from a second signal terminal 501 as 10-bit serial data. $[Vo/A]^{\#}$ is held in a register 570 as a digital value of Vo/A. $[Vo/A]^{\#}$ is a digital value obtained by normalizing Vo/A by Vref0=1.250 V. Here, descriptions are made exemplifying the case where Vo=1.8 V and a setting value of R3/R4=2. A=(R3+R4)/R4=3, and therefore, Vo/A=0.600 V. And, $[Vr0]^{\#}=[Vo/A]^{\#}=[0.600]^{\#}$ is inputted also to the register 122. Then, in the step 650, correction data of an output voltage is written in the register 122.

The process from mounting on the power supply circuit board in a step 660 is performed by a user. After mounting the power supply control IC 500 on the power supply circuit board, the user inputs a setting value of Vout to a graphic user interface (GUI) in a step 670, then 10-bit serial data converted to "Vo/A" by the GUI is inputted from the second signal terminal 501. Then, when the power supply is turned on, an automatic computation in a step 680 is performed, and after an error of the output voltage is corrected, it comes to a normal operation mode.

The output voltage correction in the step 650 will be described hereinafter.

In a first step 651, the switch SW1 is turned off and the switch SW2 is turned on, and an initial voltage V(0) of a Vfb terminal 502 is measured by a tester. Then, the value in the register 122 is made into $[Vr1]^{\#}$ via the second signal terminal 501 so as to obtain Vfb=0.600 V (=V(1)) and held. Here, Vr1=Vfb1+Vof=0.600 V, where Vfb1 is a value of the reference voltage Vref at the time when the voltage of the Vfb terminal is matched to 0.600 V, and Vof is a sum of an offset voltage of the error amplifier and an error voltage due to strain resistance in packaging. Since Vof is obtained from V(1)−V(0), Vof is written in the register 571 as a digital value $[Vof]^{\#}$ obtained by normalizing Vof by Vref0=1.250 V. Next, in a step 652, the switch SW1 is turned on and the switch SW2 is turned off, and the voltage of the Vfb terminal 502 is measured by the tester to obtain a voltage V(3). When focusing on an error ΔR of the voltage dividing resistance ratio included in this voltage V(3), V(3)=0.600/(A×(1+ΔR)), and thus 1/(1+ΔR) is computed from that and its digital value $[1/(1+\Delta R)]^{\#}$ is written in the register 572. Then, in a step 653, a computation of $[Vr2]^{\#}=[Vo/A]^{\#}\times[1/(1+\Delta R)]^{\#}-[Vof]^{\#}$ is performed by the computing circuit 580, and the result is written in the register 122 (correction of the register 122).

When the register 122 is corrected, an analog value at the non-inverting input (+ side) of the error amplifier 110 is changed from Vfb1 to Vfb2=0.600/(1+ΔR)−Vof (step 654). And, an analog value of the inverting input (− side) of the error amplifier 110 becomes Vfb=Vfb2+Vof=0.600/(1+ΔR) (step 655). As a result, the output voltage Vout after correction becomes Vout=0.600×(1/(1+ΔR))×A×(1+ΔR)=0.600×A (=Vo), thereby obtaining the targeted output voltage Vo (step 656).

In practice, although the variation of output voltage cannot be made to zero because there are quantization errors of the ADC circuit and the DAC circuit, when 10-bit ADC circuit and DAC circuit are used, a precision of lower than or equal to ±1% can be sufficiently obtained.

Fourth Embodiment

Figure 9:
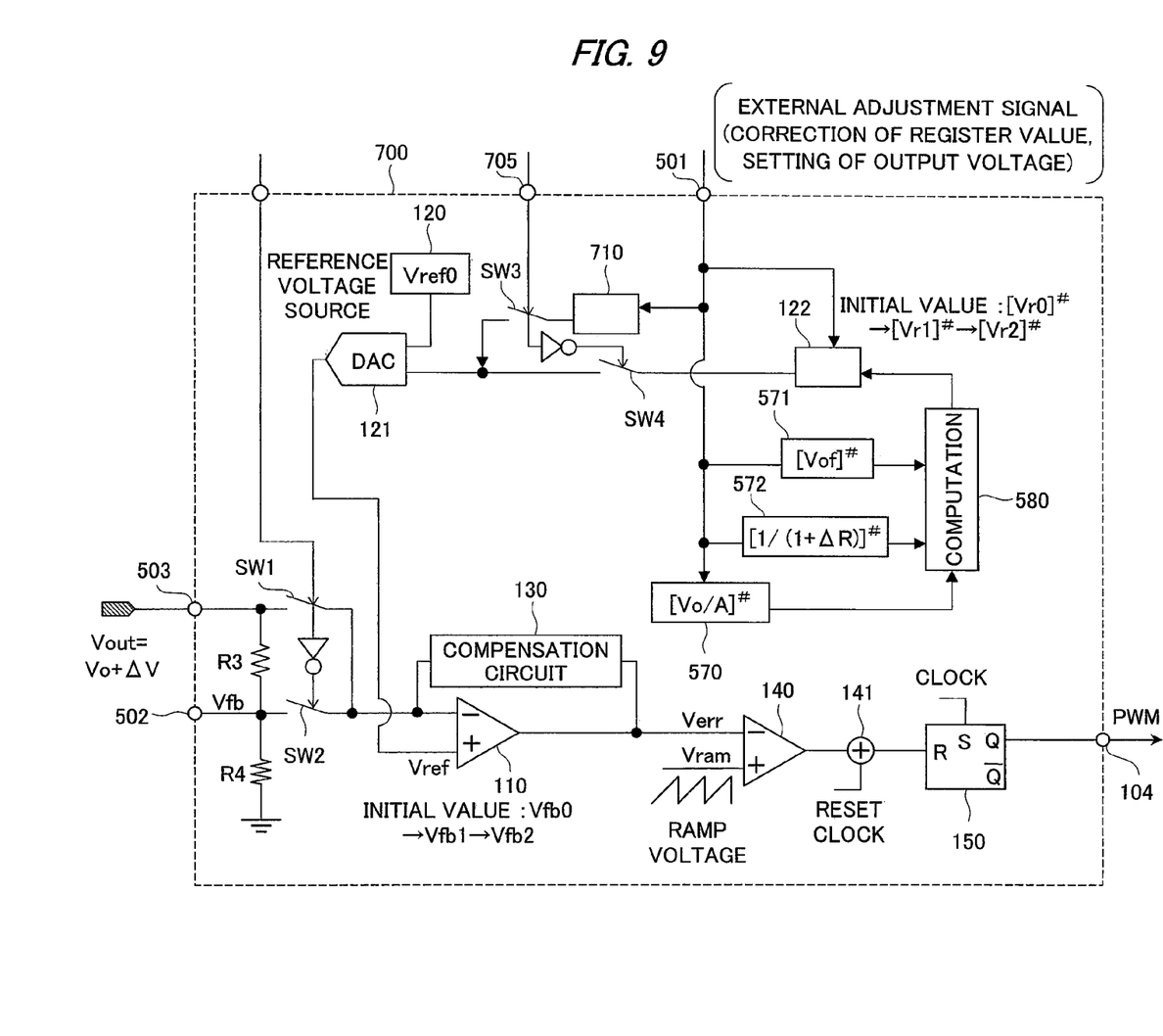
FIG. 9 is a circuit block diagram of a semiconductor device according to a fourth embodiment of the present invention.

A fourth embodiment of the present invention will be described with reference to FIG. 9. FIG. 9 is a circuit block diagram of a semiconductor device according to the fourth embodiment of the present invention.

A different point from the third embodiment is that a second input register for DAC circuit 710 and switches SW3 and SW4 are newly provided. In a normal operation, the switch SW4 is turned on and the switch SW3 is turned off, and the input register for DAC circuit 122 is connected to the DAC circuit 121 so that a predetermined output voltage is obtained. In a power-down mode, the switch SW3 is turned on and the switch SW4 is turned off, and the second input register for DAC circuit 710 to which a small value is written to obtain a low voltage responding to the power-down mode is connected to the DAC circuit 121. This mode switching is performed by inputting a control signal via a third signal terminal 705. While the case where the third signal terminal 705 is individuated from the second signal terminal 501 is shown in FIG. 9, each terminal may be provided to be shared. The power supply voltage can be easily changed in a short time according to the fourth embodiment, thereby speeding up the switching between the normal operation mode and the power-down mode.

In the foregoing, the invention made by the inventors of the present invention has been concretely described based on the embodiments. However, it is needless to say that the present invention is not limited to the foregoing embodiments and various modifications and alterations can be made within the scope of the present invention.

For instance, while the case of voltage mode control has been described as a feedback control mode of the power supply control IC in FIG. 1, FIG. 5, FIG. 6, and FIG. 9, other feedback control modes, for example, peak current mode control and average current mode control will not change effectivenesses of the present invention.

In addition, while the method of correction with respect to a voltage fluctuation due to temperature change has been described in FIG. 5, it is not needless to say that the method can be applied also to the power supply control ICs of the third embodiment in FIG. 6 and the fourth embodiment in FIG. 9.

Further, while the technique for realizing a high-speed switching between the normal mode and the power-down mode has been described in FIG. 9, the technique can be applied to the power supply control ICs of the first embodiment in FIG. 1 and the second embodiment in FIG. 5.

Still further, while it has been described in the first embodiment to the fourth embodiment that respective chips of the power supply control ICs 100, 400, 500, and 700, the driver circuit 860, the high-side power MOSFET 871, and the low-side power MOSFET 872 are integrated in one package, the present invention is not limited to the package form, and the effectivenesses of the present invention will not be changed also in the case where respective chips are contained in different packages. Also, the power supply control IC and the driver circuit may be formed on a same chip.

Moreover, since the process according to the step of automatic Vout correction represented by FIG. 2 is performed upon power-on or in the output voltage correction mode, the process may be performed upon every power-on as a part of the power-on reset process, or may be performed only when the operation mode is set. In the latter case, a nonvolatile register is preferred to be adapted to the register 122, but it is not limited to this. Even when adopting a volatile register, its register value may be transferred internally to a nonvolatile memory such as a flash memory beforehand to initially set the transferred data in the register in the power-on reset process upon power shutdown or a correction on the register.

The semiconductor device of the present invention is effectively applied to a DC power supply device in which a power supply control circuit includes a semiconductor device, and further, it is widely applicable to the semiconductor device manufacturing industry.

What is claimed is:

1. A semiconductor device included in a constant-voltage power supply device that supplies a predetermined voltage to an external load by driving a power semiconductor device, and controlling an operation of the power semiconductor device, the semiconductor device comprising:
    a first register;
    a digital-analog converter circuit outputting a reference voltage corresponding to a value of the first register with taking an output voltage of a reference voltage source as a criterial reference voltage;
    an error amplifier differentially amplifying a feedback voltage formed based on an output voltage of the constant-voltage power supply device and the reference voltage; and
    a signal generator circuit generating a control signal for driving the power semiconductor device based on an output voltage of the error amplifier.

2. The semiconductor device according to claim 1 further comprising:
    a feedback voltage terminal for inputting the feedback voltage coupled to one input terminal of the error amplifier; and
    a first signal input terminal capable of inputting a signal for correcting the value in the first register to a first correction value so that a voltage to be inputted to the one input terminal of the error amplifier becomes a target setting voltage.

3. The semiconductor device according to claim 2, wherein the first signal input terminal is a serial input terminal to which an address of the first register and data to be written in the first register are serially inputted.

4. The semiconductor device according to claim 2 wherein the feedback voltage is a voltage obtained by dividing the output voltage of the constant-voltage power supply device by a predetermined resistive voltage dividing ratio,
    the semiconductor device further comprises:
    a second register holding a digital value obtained by normalizing the resistive voltage dividing ratio by a target output voltage of the constant-voltage power supply device;
    a third register holding a digital value obtained by normalizing a target setting voltage of the reference voltage by the criterial reference voltage;
    an output voltage input terminal to which the output voltage of the constant-voltage power supply device;
    an analog-digital converter circuit converting a voltage signal to a digital value where the voltage signal is obtained by dividing a voltage by a voltage dividing resistor circuit and inputted to the feedback voltage terminal with taking a voltage inputted to the output voltage input terminal as a first reference voltage; and
    a first correction computing circuit computing a correction value based on an output of the analog-digital converter circuit, and wherein
    a second correction value is written in the first register based on a computation result of the first correction computing circuit, thereby correcting the reference voltage.

5. The semiconductor device according to claim 4, wherein the first correction computing circuit includes:
    a first computing circuit obtaining a first difference between the digital value converted by the analog-digital converter circuit and the value held in the second register;
    a second computing circuit obtaining a correction value by using the first difference and values of the second register and the third register; and
    a third computing circuit adding a computing result of the second computing circuit with the first correction value of the first register.

6. The semiconductor device according to claim 4 having an operation mode in which a computing is performed in the first correction computing circuit and the reference voltage is corrected by writing a computing result of the computing to the first register.

7. The semiconductor device according to claim 1 further comprising:
    an output voltage input terminal receiving an output voltage of the constant-voltage power supply device;
    a first resistor and a second resistor connected in series and forming the feedback voltage to a series connection node by dividing the output voltage inputted to the output voltage input terminal;
    a feedback voltage terminal connected to the series connection node of the first resistor and the second resistor;
    a first switch connecting an input terminal of the feedback voltage of the error amplifier and the output voltage input terminal;
    a second switch connecting the input terminal of the feedback voltage of the error amplifier and the feedback voltage terminal; and
    a second signal input terminal capable of inputting a signal for correcting the value in the first register to a third correction value so that a voltage of the feedback terminal becomes a target setting value in a state where the second switch is turned on and the first switch is turned off.

8. The semiconductor device according to claim 7 further comprising:
    a fourth register holding a digital value of the target setting voltage;
    a fifth register holding a digital value of an error voltage with respect to the target setting voltage;
    a sixth register holding a digital value of an error coefficient including an error of a resistive voltage dividing ratio obtained on a connection node of the first resistor and the second resistor; and
    a fourth computing circuit obtaining a correction value by using values of the fourth, fifth, and sixth registers, wherein a computing result of the fourth computing circuit is written in the first register as a fourth correction value, thereby correcting the reference voltage.

9. The semiconductor device according to claim 8, wherein,
when measuring the voltage of the feedback voltage terminal to obtain the error coefficient including the error of the resistive voltage dividing ratio, the second switch is turned off and the first switch is turned on after correcting the value of the first register to the third correction value.

10. The semiconductor device according to claim 8, wherein each digital value of the target setting voltage, the error voltage, and the error coefficient is a digital value normalized by the criterial reference voltage.

11. The semiconductor device according to claim 1 further comprising:
a seventh register holding a digital value for power-down; and
a third signal terminal to which a power-down signal is inputted, wherein,
in response to inputting the power-down signal to the third signal terminal, an input signal of the digital-analog converter circuit is switched from the held value of the first register to the held value of the seventh register, thereby lowering the reference voltage inputted to the error amplifier to a predetermined value.

12. A constant-voltage power supply device supplying a predetermined voltage to an external load by driving a power semiconductor device and including a semiconductor device for controlling an operation of the power semiconductor device, wherein
the semiconductor device includes: a first register;
a digital-analog converter circuit outputting a reference voltage corresponding to a value of the first register with taking an output voltage of a reference voltage source as a criterial reference voltage;
an error amplifier differentially amplifying a feedback voltage formed based on an output voltage of the constant-voltage power supply device and the reference voltage; and
a signal generator circuit generating a control signal (PWM) for controlling the power semiconductor device based on an output voltage of the error amplifier.

13. The constant-voltage power supply device according to claim 12, wherein
the semiconductor device further includes:
a feedback voltage terminal for inputting the feedback voltage coupled to one input terminal of the error amplifier; and
a first signal input terminal capable of inputting a signal for correcting the value in the first register to a first correction value so that a voltage to be inputted to the one input terminal of the error amplifier becomes a target setting voltage.

14. The constant-voltage power supply device according to claim 12, wherein
the semiconductor device further includes: an output voltage input terminal receiving an output voltage of the constant-voltage power supply device;
a first resistor and a second resistor connected in series and forming the feedback voltage to a series connection node by dividing the output voltage inputted to the output voltage input terminal;
a feedback voltage terminal connected to the series connection node of the first resistor and the second resistor;
a first switch connecting an input terminal of the feedback voltage of the error amplifier and the output voltage input terminal;
a second switch connecting the input terminal of the feedback voltage of the error amplifier and the feedback voltage terminal;
a second signal input terminal capable of inputting a signal for correcting the value in the first register to a third correction value so that a voltage of the feedback terminal becomes a target setting value in a state where the second switch is turned on and the first switch is turned off;
a fourth register holding a digital value of the target setting voltage;
a fifth register holding a digital value of an error voltage with respect to the target setting voltage;
a sixth register holding a digital value of an error coefficient including an error of a resistive voltage dividing ratio obtained on a connection node of the first register and the second register; and
a fourth computing circuit obtaining a correction value by using values of the fourth, fifth, and sixth registers, and wherein,
when measuring the voltage of the feedback voltage terminal to obtain the error coefficient including the error of the resistive voltage dividing ratio, the second switch is turned off and the first switch is turned on after correcting the value of the first register to the third correction value, and
a computing result of the fourth computing circuit is written in the first register as a fourth correction value, thereby correcting the reference voltage.

15. The constant-voltage power supply device according to claim 12, wherein
the semiconductor device further includes:
a seventh register holding a digital value for power-down; and
a third signal terminal to which a power-down signal is inputted, and wherein,
in response to inputting the power-down signal to the third signal terminal, an input signal of the digital-analog converter circuit is switched from the held value of the first register to the held value of the seventh register, thereby lowering the reference voltage inputted to the error amplifier to a predetermined value.

* * * * *